(12) United States Patent
Delshadpour et al.

(10) Patent No.: US 11,107,778 B2
(45) Date of Patent: Aug. 31, 2021

(54) ACTIVE SHIELDING DEVICE AND METHOD OF ACTIVE SHIELDING

(71) Applicant: NXP B.V., Eindhoven (NL)

(72) Inventors: Siamak Delshadpour, Phoenix, AZ (US); Steven Daniel, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 108 days.

(21) Appl. No.: 16/667,837

(22) Filed: Oct. 29, 2019

(65) Prior Publication Data
US 2021/0125941 A1  Apr. 29, 2021

(51) Int. Cl.
| | |
|---|---|
| H03K 5/24 | (2006.01) |
| H01L 23/00 | (2006.01) |
| G06F 21/87 | (2013.01) |
| H03K 19/20 | (2006.01) |
| G05F 1/56 | (2006.01) |

(52) U.S. Cl.
CPC ............ *H01L 23/576* (2013.01); *G05F 1/561* (2013.01); *G06F 21/87* (2013.01); *H03K 5/24* (2013.01); *H03K 19/20* (2013.01)

(58) Field of Classification Search
None
See application file for complete search history.

(56) References Cited

U.S. PATENT DOCUMENTS

| | | |
|---|---|---|
| 7,024,565 B1 | 4/2006 | Beiley et al. |
| 7,352,203 B1 | 4/2008 | Ziomek |
| 7,923,830 B2 * | 4/2011 | Pope ........................ H01L 25/16 257/679 |
| 10,204,874 B2 * | 2/2019 | Kim ....................... H01L 23/576 |
| 2013/0154834 A1 | 6/2013 | Bucsa et al. |

(Continued)

OTHER PUBLICATIONS

Briais, Sebastien et al; "Random Active Sheild"; IEEE Workshop on Fault Diagnosis and Tolerance in Cryptogrpahy; Conference Publishing Services; 11 pages (2012).

(Continued)

*Primary Examiner* — Jeffery S Zweizig

(57) ABSTRACT

Embodiments of an active shielding device and method for active shielding are disclosed. In an embodiment, an active shielding device includes current sources configured to generate currents, an analog wire shield unit connected to the current sources, switches connected between the current sources and the analog wire shield unit, a current to voltage converter connected to the analog wire shield unit and configured to generate a voltage in response to the currents that are generated by the current sources and a digital control sequence for the switches, a voltage comparator connected to the current to voltage converter and configured to compare the voltage that is generated by the current to voltage converters with a reference voltage, a digital active shielding unit connected to the current sources, digital logics configured to process the digital control sequence before conducting the digital control sequence through the digital active shielding unit and after conducting the digital control sequence through the digital active shielding unit to generate a first processing result signal and a second result signal, and a digital comparator configured to compare the first processing result signal with the second result signal.

20 Claims, 10 Drawing Sheets

(56) References Cited

U.S. PATENT DOCUMENTS

2019/0095656 A1    3/2019  Norton

OTHER PUBLICATIONS

Ling, Mengmeng et al; "Design of Monitor and Protect Circuits against FIB Attack on Chip Security"; IEEE Symposium on Security and Privacy; Conference Publishing Services; 4 pages (2012).
Kune, Denis Foo et al; "Ghost Talk: Mitigating EMI Signal Injection Attacks Against Analog Sensors"; IEEE Symposium on Security and Privacy; IEEE Computer Society; 15 pages (2013).
Weiner, Michael et al; "The Low Area Probing Detector as a Countermeasure Against Invasive Attacks"; IEEE Transactions on Very Large Scale Integration (VLSI) Systems, vol. 26, Issue 2; 12 pages (Feb. 2018).

* cited by examiner

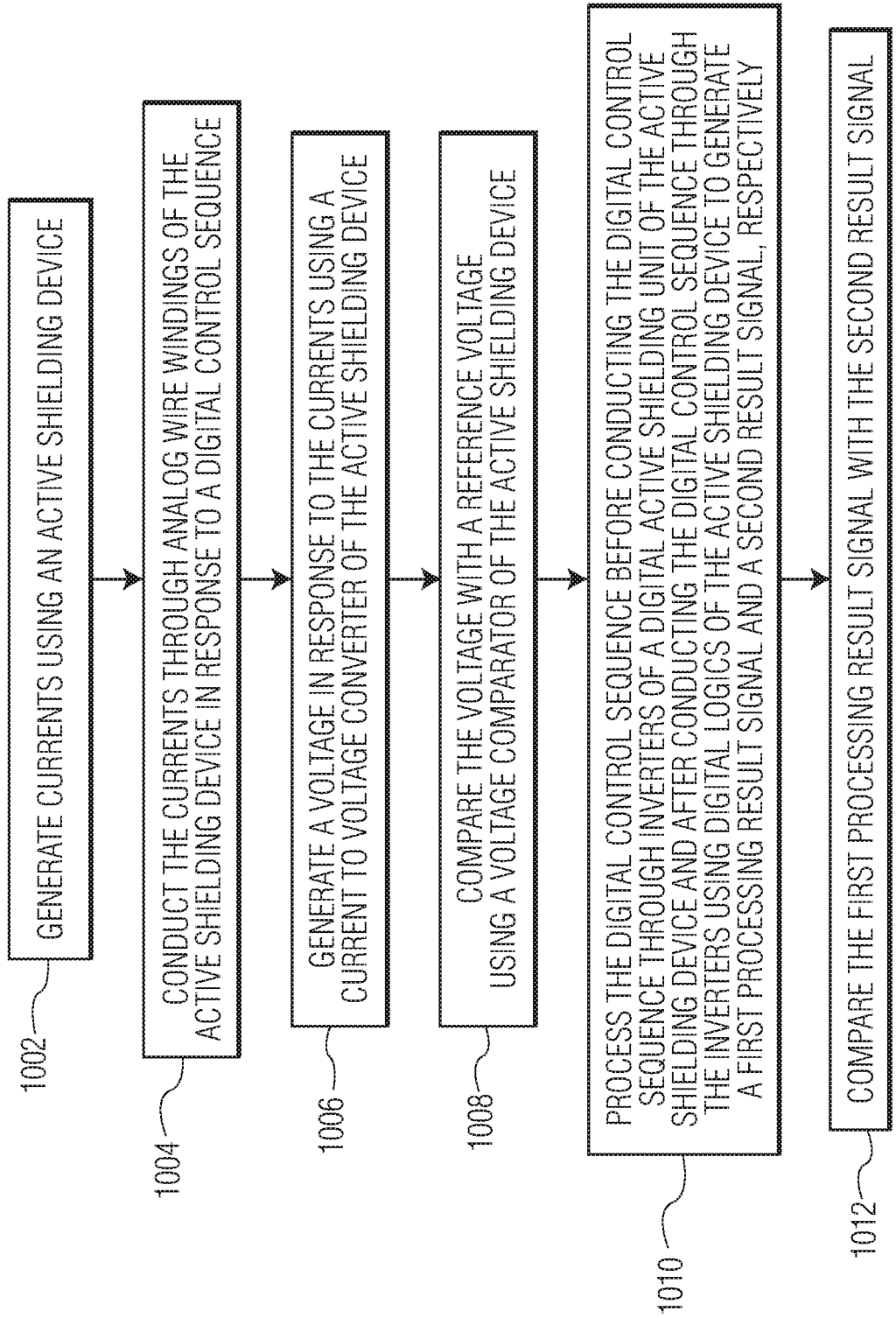

ACTIVE SHIELDING DEVICE AND METHOD OF ACTIVE SHIELDING

BACKGROUND

Invasive attacks can be used to illicitly access information from a circuit, such as a cryptographic circuit or a security circuit, or alter information at a circuit. Probing is one type of invasive attacks that can be used by an attacker to read data from an Integrated Circuit (IC) chip or to write data into an IC chip through a port (i.e., the probe tip). For example, a focused ion beam (FIB) device can cut one or more tracks in a metal layer of an IC chip and subsequently altering the structure of the IC chip, e.g., by depositing one or more new tracks or isolation layers into the IC chip and/or by implanting ions to change the doping of an area of semiconductor substrate (e.g., silicon) of the IC chip. To protect against invasive attacks, active shielding technology can be used to detect if a circuit is tampered with. For example, digital active shielding can form a physical barrier of signal lines across an IC chip and shut down the IC chip in case the IC chip is tampered with. However, although digital active shielding can offer protection against invasive attacks, digital signals that are at 0/1 levels can be hacked through long-term monitoring. Therefore, there is a need for active shielding technology that can provide more complex protection against invasive attacks.

SUMMARY

Embodiments of an active shielding device and method for active shielding are disclosed. In an embodiment, an active shielding device includes current sources configured to generate currents, an analog wire shield unit connected to the current sources, switches connected between the current sources and the analog wire shield unit, a current to voltage converter connected to the analog wire shield unit and configured to generate a voltage in response to the currents that are generated by the current sources and a digital control sequence for the switches, a voltage comparator connected to the current to voltage converter and configured to compare the voltage that is generated by the current to voltage converters with a reference voltage, a digital active shielding unit connected to the current sources, digital logics configured to process the digital control sequence before conducting the digital control sequence through the digital active shielding unit and after conducting the digital control sequence through the digital active shielding unit to generate a first processing result signal and a second result signal, and a digital comparator configured to compare the first processing result signal with the second result signal.

In an embodiment, the digital active shielding unit includes an even number of inverters.

In an embodiment, the digital logics are identical to each other.

In an embodiment, one of the digital logics is connected to the switches through the digital active shielding unit.

In an embodiment, the current sources are connected in parallel to each other.

In an embodiment, the analog wire shield unit includes analog wire windings that are connected between the current sources and the current to voltage converter.

In an embodiment, each of the analog wire windings is connected to a different current source of the current source.

In an embodiment, the active shielding device further includes a controller configured to generate the digital control sequence.

In an embodiment, the controller includes a random number generator.

In an embodiment, an active shielding device includes first, second, third, and fourth sets of current sources, where each of the first, second, third, and fourth sets of current sources is configured to generate currents, an analog wire shield unit connected to the second and fourth sets of current sources, first, second, third, and fourth sets of switches that are connected to the first, second, third, and fourth sets of current sources, respectively, and are controlled by a digital control sequence, a first current to voltage converter connected to the first set of current sources and to the fourth set of current sources through the analog wire shield unit and configured to generate a first voltage in response to the currents that are generated by the first and fourth sets of current sources, a first voltage comparator connected to the first current to voltage converter and configured to compare the first voltage with a first reference voltage, a second current to voltage converter connected to the second set of current sources and to the third set of current sources through the analog wire shield unit and configured to generate a second voltage in response to the currents that are generated by the second and third sets of current sources, a second voltage comparator connected to the second current to voltage converter and configured to compare the second voltage with a second reference voltage, a third voltage comparator configured to compare results from the first voltage comparator and from the second voltage comparator, a digital active shielding unit connected to the second and third sets of current sources, digital logics configured to process the digital control sequence before conducting the digital control sequence through the digital active shielding unit and after conducting the digital control sequence through the digital active shielding unit to generate a first processing result signal and a second result signal, and a digital comparator configured to compare the first processing result signal with the second result signal.

In an embodiment, the digital active shielding unit includes an even number of inverters.

In an embodiment, the digital logics are identical to each other.

In an embodiment, one of the digital logics is connected to the switches through the digital active shielding unit.

In an embodiment, each current source within one of the first, second, third, and fourth sets of current sources is connected in parallel to each other.

In an embodiment, the analog wire shield unit includes analog wire windings that are connected between the fourth set of current sources and the first current to voltage converter and between the second set of current sources and the second current to voltage converter.

In an embodiment, the first set of switches are connected between the first set of current sources and the first current to voltage converter, the second set of switches are connected between the second set of current sources and the analog wire shield unit, the third set of switches are connected between the third set of current sources and the second current to voltage converter, and the fourth set of switches are connected between the fourth set of current sources and the analog wire shield unit.

In an embodiment, the active shielding device further includes a controller configured to generate the digital signal sequence to control the first, second, third, and fourth sets of switches.

In an embodiment, the controller includes a random number generator.

In an embodiment, a method for active shielding involves generating currents using an active shielding device, conducting the currents through analog wire windings of an active shielding unit of the active shielding device in response to a digital control sequence, generating a voltage in response to the currents using a current to voltage converter of the active shielding device, comparing the voltage with a reference voltage using a voltage comparator of the active shielding device, processing the digital control sequence before conducting the digital control sequence through inverters of an active shielding unit of the active shielding device and after conducting the digital control sequence through the inverters using digital logics of the active shielding device to generate a first processing result signal and a second result signal, respectively, and comparing the first processing result signal with the second result signal.

In an embodiment, the digital active shielding unit includes an even number of inverters, and wherein the digital logics are identical to each other.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 10 is a process flow diagram of a method of communications in accordance to another embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
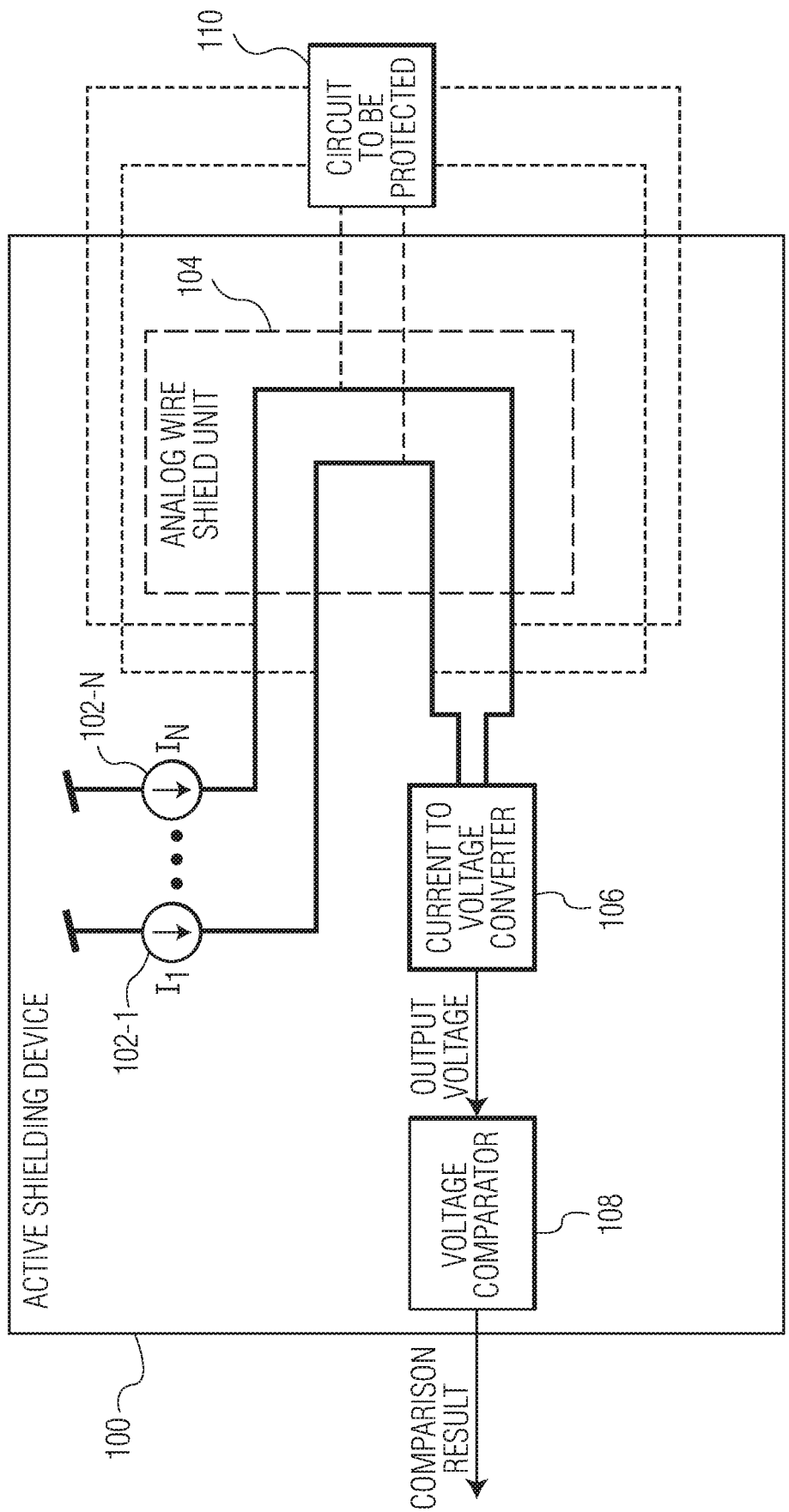
FIG. 1 depicts an active shielding device in accordance with an embodiment of the invention.

FIG. 1 depicts an active shielding device 100 in accordance with an embodiment of the invention. In the embodiment depicted in FIG. 1, the active shielding device includes multiple current sources 102-1, 102-2, . . . , 102-N, where N is an integer that is greater than one, an analog wire shield unit 104 connected to the current sources, a current to voltage converter 106 connected to the analog wire shield unit, and a voltage comparator 108 connected to the current to voltage converter. The active shielding device is used to protect a circuit to be protected 110, which can be a cryptographic circuit, a security circuit, or other circuit, which can be connected to electrical wires or cables within the analog wire shield unit, electrical wires or cables between the current sources and the analog wire shield unit, or electrical wires or cables between the analog wire shield unit and the current to voltage converter. The active shielding device can be used in various applications, such as automotive applications, communications applications, industrial applications, medical applications, computer applications, and/or consumer or appliance applications. Although the illustrated active shielding device 100 is shown with certain components and described with certain functionality herein, other embodiments of the active shielding device may include fewer or more components to implement the same, less, or more functionality. For example, the active shielding device may include more than one analog wire shield unit. In another example, in some embodiments, the active shielding device may include more than one current to voltage converter and more than one voltage comparator. In yet another example, although the current sources 102-1, 102-2, . . . , 102-N are shown in FIG. 1 as being part of the active shielding device, in some embodiments, the current sources are external to the active shielding device and are not components of the active shielding device. In some embodiments, the active shielding device is an active shielding circuit. Components of the active shielding circuit may be implemented on a single substrate (e.g., integrated into the same IC chip) or distributed on multiple substrates (e.g., implemented on multiple IC chips). For example, at least one of the current sources, the analog wire shield unit, the current to voltage converter, and the voltage comparator is implemented on a single substrate (e.g., integrated into one IC chip) or distributed on multiple substrates (e.g., implemented on multiple IC chips). In some embodiments, the active shielding device and the circuit to be protected are integrated into the same IC chip.

Compared to an active shielding device that relies solely on digital shielding, the active shielding device 100 depicted in FIG. 1 implements analog active shielding that can be used independent from digital active shielding or in combination with digital active shielding. In the embodiment depicted in FIG. 1, the active shielding device uses multiple current sources 102-1, 102-2, . . . , 102-N and the analog wire shield unit 104 for active shielding. Performance of active shielding in current domain is better than active shielding in voltage domain due to less noise injection. Current values from the analog current sources can be generated randomly, in form of a known pattern, or a combination of them. In addition, digital probing or applying 0/1 to the analog wire shield unit can be detected easily. For example, any invasive attack that cuts one or more electrical wires or cables within the analog wire shield unit 104 or applies 0/1 to one or more electrical wires or cables within the analog wire shield unit affects one or more currents that are generated by the current sources 102-1, 102-2, . . . , 102-N, and changes the voltage range.

In the embodiment depicted in FIG. 1, the current sources 102-1, 102-2, . . . , 102-N are configured to generate multiple currents, $I_1, I_2, \ldots , I_N$. The current sources can be implemented using various types of current sources that are known in the art. In some embodiments, the currents generated by the current sources are different from each other (i.e., each current source generates a unique current). In other embodiments, at least two of the currents, $I_1, I_2, \ldots , I_N$, generated by the current sources are identical to each other. In the embodiment depicted in FIG. 1, the current sources are connected in parallel to each other such that each of the currents, $I_1, I_2, \ldots , I_N$, flows through the analog wire shield unit 104 in parallel. In some embodiments, the current sources are connected to positive voltages, which may be identical with each other or different from each other.

In the embodiment depicted in FIG. 1, the analog wire shield unit 104 is connected between the current sources 102-1, 102-2, . . . , 102-N and the current to voltage converter 106. The analog wire shield unit may include one or more electrical cables or wires, which are made of conductive materials (e.g., metals). In some embodiments, the analog wire shield unit includes multiple analog wire windings that are connected between the current sources and the current to voltage converter. In these embodiments, each of the current sources is connected to a different analog wire winding of the analog wire windings.

Figure 2:
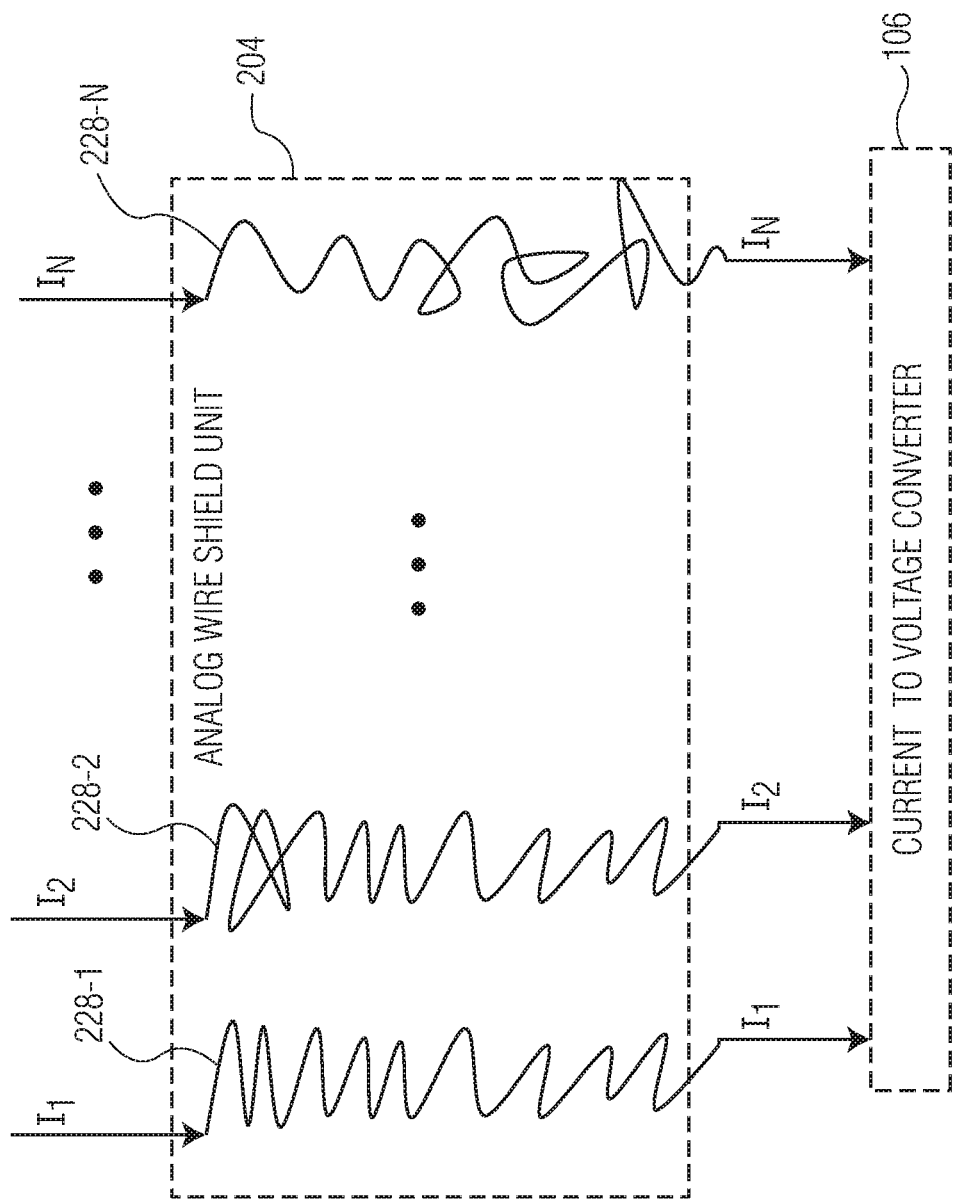
FIG. 2 depicts an embodiment of an analog wire shield unit of the active shielding device depicted in FIG. 1.

FIG. 2 depicts an analog wire shield unit 204, which is an embodiment of the analog wire shield unit 104 depicted in FIG. 1. However, the analog wire shield unit 104 depicted in FIG. 1 is not limited to the embodiment shown in FIG. 2. In the embodiment depicted in FIG. 2, the analog wire shield unit 204 includes multiple analog wire windings 228-1, 228-2, . . . , 228-N that are connected to the current sources 102-1, 102-2, . . . , 102-N and to the current to voltage converter 106. In the analog wire shield unit, each of the analog wire windings is connected to a different current source. For example, currents, I1, is conducted through the analog wire winding 228-1 to the current to voltage converter, currents, I2, is conducted through the analog wire winding 228-2 to the current to voltage converter, and currents, IN, is conducted through the analog wire winding 228-N to the current to voltage converter. In some embodiments, at least one of the analog wire windings 228-1, 228-2, . . . , 228-N is implemented on a topmost layer or topmost layers of an IC chip into which the active shielding device 100 is packaged. Security routing may be implemented on metal layers to minimal pitch and Arithmetic logic unit (Alu) width. In some embodiments, unused channels and/or spaces are filled to produce a shielded layout, which can thwart optical inspection and/or probing. In some embodiments, randomized routing is used in parallel and multi-layer interconnection is combined with a high metal density, which makes it more difficult for an attacker to get access to the relevant information in lower metal layers. In some embodiments, lower metals layers are used for signal lines and supply lines, which are not visible or accessible via pin connections. In some embodiments, lower metal layers are used for analog blocks with exception of ground and supply lines. Although the illustrated analog wire shield unit is shown with certain components and described with certain functionality herein, other embodiments of the analog wire shield unit may include fewer or more components to implement the same, less, or more functionality. For example, the analog wire shield unit may include more analog wire windings or less analog wire windings as shown in FIG. 2. In another example, although the analog wire windings 228-1, 228-2, . . . , 228-N are shown in FIG. 2 as having wire windings in certain form or style, in other embodiments, at least one of the analog wire windings 228-1, 228-2, . . . , 228-N may have a wire winding in a form or style that is different from the form or style shown in FIG. 2.

Turning back to FIG. 1, the current to voltage converter 106 of the active shielding device 100 is configured to generate at least one voltage in response to the currents, $I_1, I_2, \ldots , I_N$, that are generated by the current sources 102-1, 102-2, . . . , 102-N. In some embodiments, the current to voltage converter is configured to generate a voltage that is proportional to the currents, $I_1, I_2, \ldots , I_N$, or a sum of the currents, $I_1, I_2, \ldots , I_N$.

Figure 3:
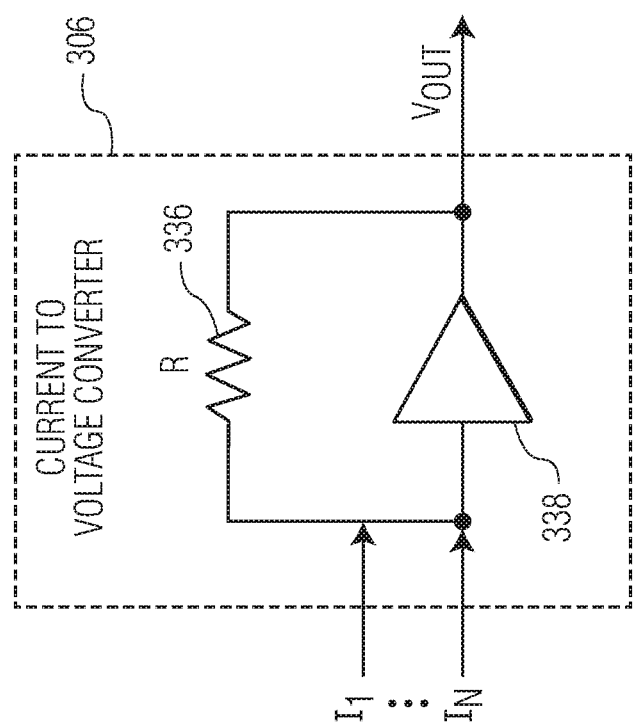
FIG. 3 depicts an embodiment of a current to voltage converter of the active shielding device depicted in FIG. 1.

FIG. 3 depicts a current to voltage converter 306, which is an embodiment of the current to voltage converter 106 depicted in FIG. 1. However, the current to voltage converter 106 depicted in FIG. 1 is not limited to the embodiment shown in FIG. 3. In the embodiment depicted in FIG. 3, the current to voltage converter 306 includes a resistor 336 and an amplifier 338. In some embodiments, the amplifier is an operational amplifier (op-amp). In the embodiment depicted in FIG. 3, the resistor has a fixed resistance value, "R." However, in other embodiments, the resistor may have a variable resistance value. In an example of the operation of the current to voltage converter 206, the amplifier and the resistor receive the currents, $I_1, I_2, \ldots , I_N$ that are generated by the current sources 102-1, 102-2, . . . , 102-N of the active shielding device 100 depicted in FIG. 1 and generates an output voltage, "$V_{OUT}$," which may be proportional to the sum of the currents, $I_1, I_2, \ldots, I_N$. In an embodiment, the output voltage, $V_{OUT}$, can be expressed as:

$$V_{OUT}=R\times(I_1+I_2+\ldots+I_N). \quad (1)$$

Although the illustrated current to voltage converter is shown with certain components and described with certain functionality herein, other embodiments of the current to voltage converter may include fewer or more components to implement the same, less, or more functionality. For example, the current to voltage converter may include more than one amplifier and/or resistor or use different schemes/designs.

Turning back to FIG. 1, the voltage comparator 108 of the active shielding device 100 is configured to compare at least one voltage that is generated by the current to voltage converter 106 with at least one reference voltage. In some embodiments, the voltage comparator is configured to compare a voltage that is generated by the current to voltage converter 106 with multiple reference voltages. Based on the comparison result between the voltage that is generated by the current to voltage converter and the at least one reference voltage, it can be determined whether or not the electrical cables or wires within the analog wire shield unit 104 are tampered with (e.g., voltage probing that involves cutting into the electrical cables or wires within the analog wire shield unit or altering at least one voltage or current in the electrical cables or wires within the analog wire shield unit. In some embodiments, if the voltage that is generated by the current to voltage converter is identical with the at least one reference voltage or within a threshold (e.g., ±1%) to the at least one reference voltage, it is determined that the electrical cables or wires within the analog wire shield unit are not tampered with. In these embodiments, if the voltage that is generated by the current to voltage converter is different from the at least one reference voltage or not within a threshold (e.g., ±1%) to the at least one reference voltage, it is determined that the electrical cables or wires within the analog wire shield unit are tampered with. In some embodiments, the active shielding device includes a controller that is configured to determine whether or not the electrical cables or wires within the analog wire shield unit are tampered with. The controller may be implemented in hardware (e.g., circuit or circuits), software, firmware, or a combination thereof. In an embodiment, the controller is implemented using a processor, such as a microcontroller, a host processor, a host, a digital signal processor (DSP), or a central processing unit (CPU). In some embodiments, the controller is configured to shut down or disable the circuit to be protected 110 if the electrical cables or wires within the analog wire shield unit are tampered with.

Figure 4:
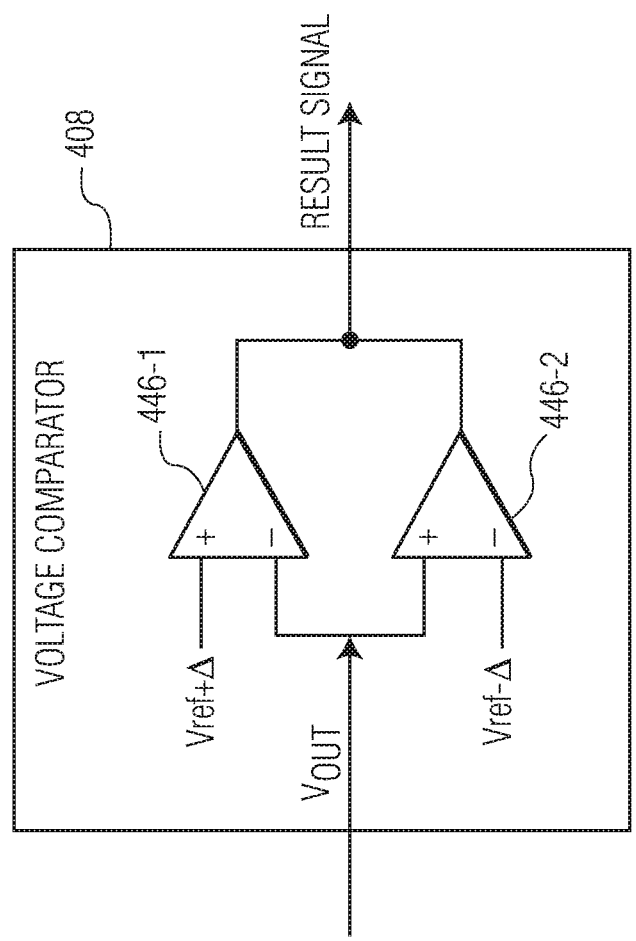
FIG. 4 depicts an embodiment of a voltage comparator of the active shielding device depicted in FIG. 1.

FIG. 4 depicts a voltage comparator 408, which is an embodiment of the voltage comparator 108 depicted in FIG. 1. However, the voltage comparator 108 depicted in FIG. 1 is not limited to the embodiment shown in FIG. 4. In the embodiment depicted in FIG. 4, the voltage comparator 408 includes two voltage comparison circuits 446-1, 446-2. In an example of the operation of the voltage comparator, the voltage comparison circuit 446-1 compares the output voltage, $V_{OUT}$, from the current to voltage converter 306 with a reference voltage, Vref+Δ, while the voltage comparison circuit 446-2 compares the output voltage, $V_{OUT}$, from the current to voltage converter with a reference voltage, Vref−Δ. A result signal is generated based on the comparison results of the voltage comparison circuits 446-1, 446-2. Although the illustrated voltage comparator is shown with certain components and described with certain functionality herein, other embodiments of the voltage comparator may include fewer or more components to implement the same, less, or more functionality. For example, the voltage comparator may include a single voltage comparison circuit or more than two voltage comparison circuit for different degree of voltage comparison precision.

Figure 5:
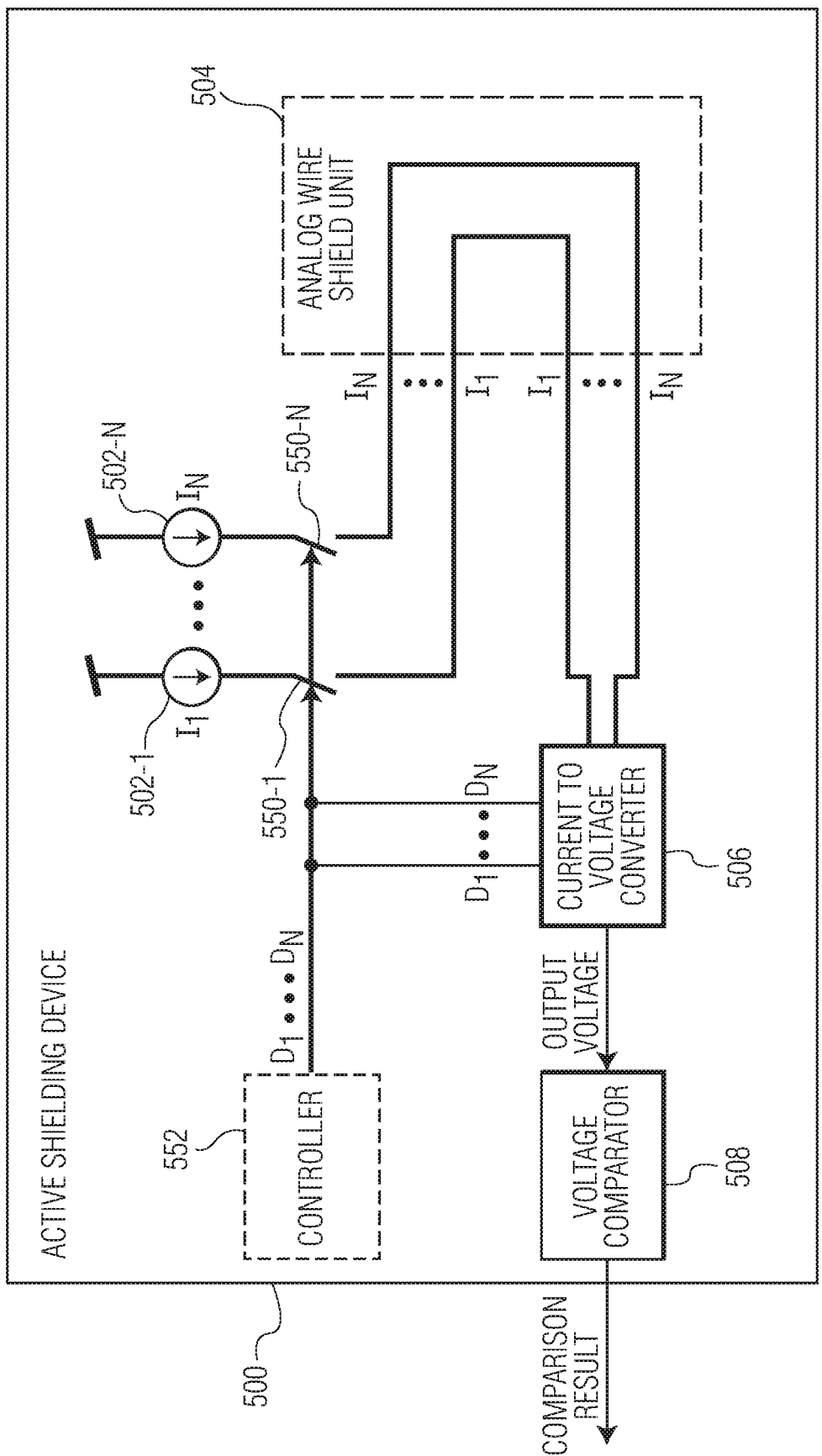
FIG. 5 depicts an active shielding device that includes multiple switches to control multiple current sources in accordance with an embodiment of the invention.

In some embodiments, one or more switches are used to select one or more of the current sources 102-1, 102-2, ..., 102-N to apply to the analog wire shield unit 104. Consequently, voltages on the analog wire shield unit may vary, depending upon how many current source(s) or which of the current sources is/are selected, which makes it more difficult for an attacker to access information by probing a voltage of the analog wire shield unit. FIG. 5 depicts an active shielding device 500 that includes multiple switches 550-1, 550-2, ..., 550-N to control multiple current sources 502-1, 502-2, ..., 502-N in accordance with an embodiment of the invention. In the embodiment depicted in FIG. 5, the active shielding device includes the current sources 502-1, 502-2, ..., 502-N, an analog wire shield unit 504 connected to the current sources, a current to voltage converter 506 connected to the analog wire shield unit, a voltage comparator 508 connected to the current to voltage converter, the switches 550-1, 550-2, ..., 550-N, and an optional controller 552. The current sources 502-1, 502-2, ..., 502-N, the analog wire shield unit 504, the current to voltage converter 506, and the voltage comparator 508 in the embodiment depicted in FIG. 5 are the same as or similar to the current sources 102-1, 102-2, ..., 102-N, the analog wire shield unit 104, the current to voltage converter 106, and the voltage comparator 108 in the embodiment depicted in FIG. 1, respectively. Although the illustrated active shielding device 500 is shown with certain components and described with certain functionality herein, other embodiments of the active shielding device may include fewer or more components to implement the same, less, or more functionality. For example, the active shielding device may include more than one analog wire shield unit. In another example, in some embodiments, the active shielding device may include more than one current to voltage converter and more than one voltage comparator. The active shielding device can operate in a first operational mode in which the active shielding device uses random data or known sequence to drive values on electrical cables or wires between the current sources and the current to voltage converter and subsequently check the results from the voltage comparator. The active shielding device can also operate in a second operational mode that allows for a specific value to be written to the active shielding device and a result be read back, which allows the active shielding device to be used as part of a secret that fails when the active shielding device is broken.

In the embodiment depicted in FIG. 5, the current sources 502-1, 502-2, ..., 502-N are configured to generate multiple currents, $I_1, I_2, \ldots, I_N$. The current sources can be implemented using various types of current sources that are known in the art. In some embodiments, the currents generated by the current sources are different from each other (i.e., each current source generates a unique current). In other embodiments, at least two of the currents, $I_1, I_2, \ldots, I_N$, generated by the current sources are identical to each other. In the embodiment depicted in FIG. 5, the current sources are connected in parallel to each other such that each of the currents, $I_1, I_2, \ldots, I_N$, flows through the analog wire shield unit 504 in parallel.

In the embodiment depicted in FIG. 5, the analog wire shield unit 504 is connected between the current sources 502-1, 502-2, ..., 502-N and the current to voltage converter 506. The analog wire shield unit may include one or more electrical cables or wires, which are made of conductive materials (e.g., metals). In some embodiments, the analog wire shield unit includes multiple analog wire windings that are connected between the current sources and the current to voltage converter. In these embodiments, each of the current sources is connected to a different analog wire winding of the analog wire windings.

In the embodiment depicted in FIG. 5, the current to voltage converter 506 is configured to generate at least one voltage in response to the currents, $I_1, I_2, \ldots, I_N$, that are generated by the current sources 502-1, 502-2, ..., 502-N. In some embodiments, the current to voltage converter is configured to generate a voltage that is proportional to the currents, $I_1, I_2, \ldots, I_N$, or a sum of the currents, $I_1, I_2, \ldots, I_N$.

In the embodiment depicted in FIG. 5, the voltage comparator 508 is configured to compare at least one voltage that is generated by the current to voltage converter 506 with at least one reference voltage. In some embodiments, the voltage comparator is configured to compare a voltage that is generated by the current to voltage converter 506 with multiple reference voltages. Based on the comparison result between the voltage that is generated by the current to voltage converter and the at least one reference voltage, it can be determined whether or not the electrical cables or wires within the analog wire shield unit 504 are tampered with (e.g., voltage probing that involves cutting into the electrical cables or wires within the analog wire shield unit or altering at least one voltage or current in the electrical cables or wires within the analog wire shield unit. In some embodiments, if the voltage that is generated by the current to voltage converter is identical with the at least one reference voltage or within a threshold (e.g., ±1%) to the at least one reference voltage, it is determined that the electrical cables or wires within the analog wire shield unit are not tampered with. In these embodiments, if the voltage that is generated by the current to voltage converter is different from the at least one reference voltage or not within a threshold (e.g., ±1%) to the at least one reference voltage, it is determined that the electrical cables or wires within the analog wire shield unit are tampered with.

In the embodiment depicted in FIG. 5, the switches 550-1, 550-2, ..., 550-N are connected between the current sources 502-1, 502-2, ..., 502-N and the analog wire shield unit 504 and are configured to select one or more of the current sources to apply to the analog wire shield unit, based on control signals, $D_1, D_2, \ldots, D_N$. In the embodiment depicted in FIG. 5, the controller 552 is configured to generate control signals, $D_1, D_2, \ldots, D_N$ to control the switches 550-1, 550-2, ..., 550-N and/or the current to voltage converter 506. By controlling the switches and/or the current to voltage converter, voltages on the analog wire shield unit can vary (e.g., depending upon how many current source(s) or which of the current sources is/are selected), which makes it difficult for an attacker to access information by probing a voltage of the analog wire shield unit. The controller may be implemented in hardware (e.g., circuit or circuits), software, firmware, or a combination thereof. In an embodiment, the controller is implemented using a processor, such as a microcontroller, a host processor, a host, a DSP, or a CPU. The control signals, $D_1, D_2, \ldots, D_N$ may be digital signals, which can be random digital signals/sequences or pre-defined digital signals/sequences. In some embodiments, the controller includes a random number generator configured to generate random digital sequences. Although the controller is shown in FIG. 5 as being a component of the active shielding device 500, in other embodiments, the controller is external to the active shielding device. In some embodiments, the controller is configured to determine whether or not the electrical cables or wires within the analog wire shield unit are tampered with. In some embodiments, the controller is configured to shut down or disable a circuit to be protected, which can be connected to electrical wires or cables within the analog wire shield unit, electrical wires or cables between the current sources and the analog wire shield unit, or electrical wires or cables between the analog wire shield unit and the current to voltage converter, if the electrical cables or wires within the analog wire shield unit are tampered with. In some embodiments, digital active shielding can be combined with analog active shielding to provide more complex protection against invasive attacks. In some embodiments, one or more digital logic circuits are serially connected with an electrical cable or wire such that signals in the electrical cable or wire can be altered by the digital logic circuits. For example, voltages on the electrical cable or wire may vary, depending upon the place or section at which the electrical cable or wire is probed, which makes it more difficult for an attacker to access information by probing the voltage at the electrical cable or wire.

Figure 6:
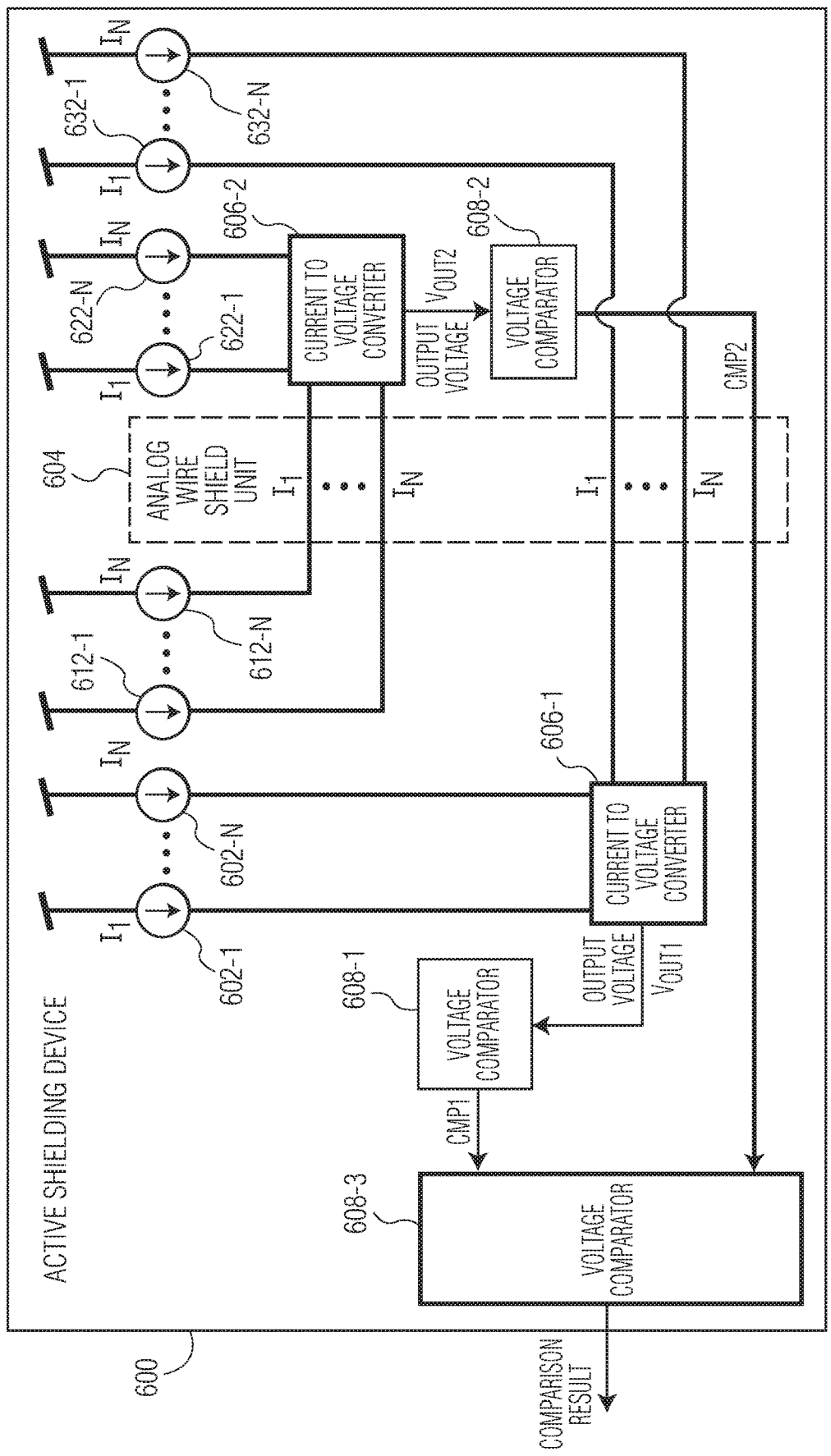
FIG. 6 depicts an active shielding device that includes multiple sets of current sources, multiple current to voltage converters, and multiple voltage comparators in accordance with an embodiment of the invention.

In some embodiments, multiple sets of current sources, current to voltage converters, and voltage comparators are used with an analog wire shield unit. Consequently, voltages on the analog wire shield unit may be verified or validated repetitively, which makes it more difficult for an attacker to access information by probing a voltage of the analog wire shield unit. FIG. 6 depicts an active shielding device 600 that includes multiple sets of current sources 602-1, 602-2, ..., 602-N, 612-1, 612-2, ..., 612-N, 622-1, 622-2, ..., 622-N, 632-1, 632-2, ..., 632-N, current to voltage converters 606-1, 606-2, and voltage comparators 608-1, 608-2, 608-3 in accordance with an embodiment of the invention. In the embodiment depicted in FIG. 6, the active shielding device includes a first set of current sources 602-1, 602-2, ..., 602-N, a second set of current sources 612-1, 612-2, ..., 612-N, a third set of current sources 622-1, 622-2, ..., 622-N, and a fourth set of current sources 632-1, 632-2, ..., 632-N, an analog wire shield unit 604 connected to the current sources, first and second current to voltage converters 606-1, 606-2 connected to the analog wire shield unit, first and second voltage comparators 608-1, 608-2 connected to the current to voltage converters, and a third voltage comparator 608-3 connected to the first and second voltage comparators 608-1, 608-2. The current sources 602-1, 602-2, ..., 602-N, 612-1, 612-2, ..., 612-N, 622-1, 622-2, ..., 622-N, 632-1, 632-2, ..., 632-N, the analog wire shield unit 604, the current to voltage converters 606-1, 606-2, and the voltage comparators 608-1, 608-2, 608-3 in the embodiment depicted in FIG. 6 are the same as or similar to the current sources 102-1, 102-2, ..., 102-N, the analog wire shield unit 104, the current to voltage converter 106, and the voltage comparator 108 in the embodiment depicted in FIG. 1, respectively. Although the illustrated active shielding device 600 is shown with certain components and described with certain functionality herein, other embodiments of the active shielding device may include fewer or more components to implement the same, less, or more functionality. For example, the active shielding device may include more than one analog wire shield unit.

In the embodiment depicted in FIG. 6, each of the first set of current sources 602-1, 602-2, ..., 602-N, the second set of current sources 612-1, 612-2, ..., 612-N, the third set of current sources 622-1, 622-2, ..., 622-N, and the fourth set of current sources 632-1, 632-2, ..., 632-N is configured to generate multiple currents, $I_1, I_2, \ldots, I_N$. The current sources can be implemented using various types of current sources that are known in the art. In some embodiments, the currents generated by the current sources are different from each other (i.e., each current source generates a unique current). In other embodiments, at least two of the currents, $I_1, I_2, \ldots, I_N$, generated by the current sources are identical to each other. In the embodiment depicted in FIG. 6, each current source within one of the first, second, third, and fourth sets of current sources is connected in parallel to each other such that each of the currents, $I_1, I_2, \ldots, I_N$, flows through the analog wire shield unit 604 in parallel.

In the embodiment depicted in FIG. 6, the analog wire shield unit 604 is connected to the second set of current sources 612-1, 612-2, . . . , 612-N, and to the fourth set of current sources 632-1, 632-2, . . . , 632-N. The analog wire shield unit may include one or more electrical cables or wires, which are made of conductive materials (e.g., metals). In some embodiments, the analog wire shield unit includes multiple analog wire windings that are connected between the second set of current sources 612-1, 612-2, . . . , 612-N or the fourth set of current sources 632-1, 632-2, . . . , 632-N and the current to voltage converters 606-1, 606-2. In these embodiments, each current source within the second set of current sources 612-1, 612-2, . . . , 612-N is connected to a different analog wire winding of the analog wire windings, and/or each current source within the fourth set of current sources 632-1, 632-2, . . . , 632-N is connected to a different analog wire winding of the analog wire windings.

In the embodiment depicted in FIG. 6, the first current to voltage converter 606-1 is connected to the first set of current sources 602-1, 602-2, . . . , 602-N and to the fourth set of current sources 632-1, 632-2, . . . , 632-N through the analog wire shield unit 604. The first current to voltage converter 604-1 is configured to generate a first output voltage, $V_{out1}$, in response to the currents, $I_2, \ldots, I_N$, that are generated by the first and fourth sets of current sources 602-1, 602-2, . . . , 602-N, 632-1, 632-2, . . . , 632-N. In some embodiments, the first output voltage, $V_{out1}$, is proportional to the currents, $I_1, I_2, \ldots, I_N$, or a sum of the currents, $I_1, I_2, \ldots, I_N$.

In the embodiment depicted in FIG. 6, the first voltage comparator 608-1 is connected to the first current to voltage converter 606-1 and configured to compare the first output voltage, $V_{out1}$, with at least one reference voltage to generate a result signal, CMP1, which may be an analog signal or a digital signal. In some embodiments, the first voltage comparator includes multiple voltage comparison circuits configured to compare the first output voltage, $V_{out1}$, with multiple reference voltages.

In the embodiment depicted in FIG. 6, the second current to voltage converter 606-2 is connected to the second set of current sources 612-1, 612-2, . . . , 612-N and to the third set of current sources 622-1, 622-2, . . . , 622-N through the analog wire shield unit 604. The second current to voltage converter is configured to generate a second output voltage, $V_{out2}$, in response to the currents, $I_1, I_2, \ldots, I_N$, that are generated by the second and third sets of current sources 612-1, 612-2, . . . , 612-N, 622-1, 622-2, . . . , 622-N. In some embodiments, the second output voltage, $V_{out2}$, is proportional to the currents, $I_1, I_2, \ldots, I_N$, or a sum of the currents, $I_1, I_2, \ldots, I_N$.

In the embodiment depicted in FIG. 6, the second voltage comparator 608-2 is connected to the second current to voltage converter 606-2 and configured to compare the second output voltage, $V_{out2}$, with at least one reference voltage to generate a result signal, CMP2, which may be an analog signal or a digital signal. In some embodiments, the first voltage comparator includes multiple voltage comparison circuits configured to compare the second output voltage, $V_{out1}$, with multiple reference voltages.

In the embodiment depicted in FIG. 6, the third voltage comparator 608-3 is configured to compare the result signal, CMP1, from the first voltage comparator 608-1 and the result signal, CMP2, from the second voltage comparator 608-2 to generate a comparison result. Based on the comparison result from the third voltage comparator, it can be determined whether or not the electrical cables or wires within the analog wire shield unit 604 are tampered with (e.g., voltage probing that involves cutting into the electrical cables or wires within the analog wire shield unit or altering at least one voltage or current in the electrical cables or wires within the analog wire shield unit. In some embodiments, if the result signal, CMP1, from the first voltage comparator 608-1 is identical with the result signal, CMP2, from the second voltage comparator 608-2 or within a threshold (e.g., ±1%) to the result signal, CMP2, from the second voltage comparator 608-2, it is determined that the electrical cables or wires within the analog wire shield unit are not tampered with. In these embodiments, if the result signal, CMP1, from the first voltage comparator 608-1 is different from the result signal, CMP2, from the second voltage comparator 608-2 or not within a threshold (e.g., ±1%) to the result signal, CMP2, from the second voltage comparator 608-2, it is determined that the electrical cables or wires within the analog wire shield unit are tampered with. In some embodiments, the active shielding device includes a controller that is configured to determine whether or not the electrical cables or wires within the analog wire shield unit are tampered with. The controller may be implemented in hardware (e.g., circuit or circuits), software, firmware, or a combination thereof. In an embodiment, the controller is implemented using a processor, such as a microcontroller, a host processor, a host, a DSP, or a CPU. In some embodiments, the controller is configured to shut down or disable a circuit to be protected, which can be connected to electrical wires or cables within the analog wire shield unit, electrical wires or cables between the current sources and the analog wire shield unit, or electrical wires or cables between the analog wire shield unit and the current to voltage converters, if the electrical cables or wires within the analog wire shield unit are tampered with. In some embodiments, digital active shielding can be combined with analog active shielding to provide more complex protection against invasive attacks. In some embodiments, one or more digital logic circuits are serially connected with an electrical cable or wire such that signals in the electrical cable or wire can be altered by the digital logic circuits. For example, voltages on the electrical cable or wire may vary, depending upon the place or section at which the electrical cable or wire is probed, which makes it more difficult for an attacker to access information by probing the voltage at the electrical cable or wire.

Figure 7:
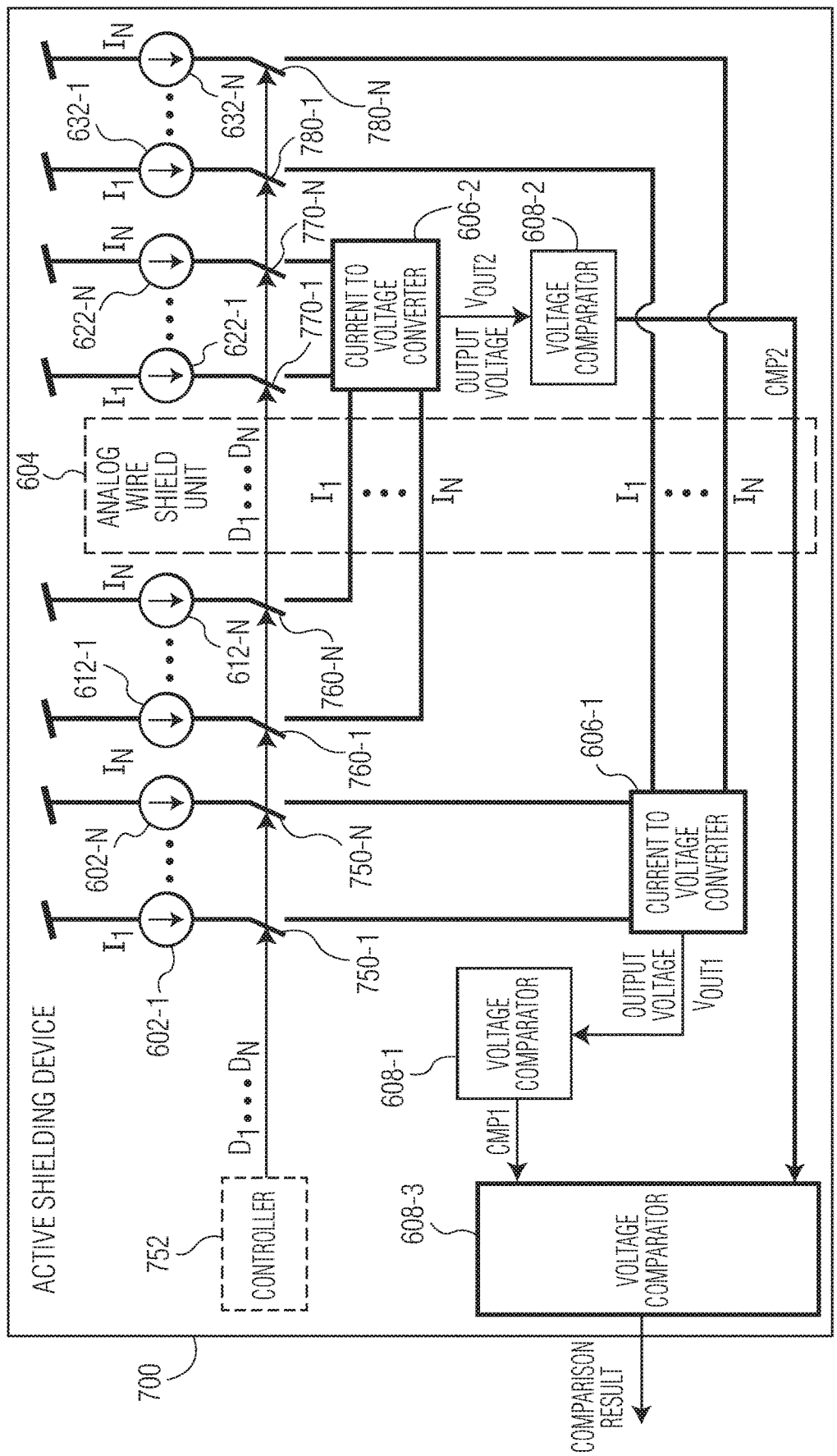
FIG. 7 depicts an active shielding device that includes multiple switches to control current sources in accordance with an embodiment of the invention.

In some embodiments, one or more switches are used to select one or more of the current sources 602-1, 602-2, . . . , 602-N, 612-1, 612-2, . . . , 612-N, 622-1, 622-2, . . . , 622-N, 632-1, 632-2, . . . , 632-N to apply to the analog wire shield unit 604, the first current to voltage converter 606-1, or the second current to voltage converter 606-2. Consequently, voltages on the analog wire shield unit may vary, depending upon how many current source(s) or which of the current sources is/are selected, which makes it more difficult for an attacker to access information by probing a voltage of the analog wire shield unit. FIG. 7 depicts an active shielding device 700 that includes multiple switches 750-1, 750-2, ..., 750-N, 760-1, 760-2, ..., 760-N, 770-1, 770-2, ..., 770-N, 780-1, 780-2, ..., 780-N to control the current sources 602-1, 602-2, ..., 602-N, 612-1, 612-2, ..., 612-N, 622-1, 622-2, ..., 622-N, 632-1, 632-2, ..., 632-N in accordance with an embodiment of the invention. In the embodiment depicted in FIG. 7, the active shielding device includes the current sources 602-1, 602-2, ..., 602-N, 612-1, 612-2, ..., 612-N, 622-1, 622-2, ..., 622-N, 632-1, 632-2, ..., 632-N, the analog wire shield unit 604 connected to the current sources, the first and second current to voltage converters 606-1, 606-2 connected to the analog wire shield unit, the first and second voltage comparators 608-1, 608-2 connected to the current to voltage converters, the third voltage comparator 608-3 connected to the first and second voltage comparators 608-1, 608-2, the switches 750-1, 750-2, ..., 750-N, 760-1, 760-2, ..., 760-N, 770-1, 770-2, ..., 770-N, 780-1, 780-2, ..., 780-N, and an optional controller 752. The switches 750-1, 750-2, ..., 750-N, 760-1, 760-2, ..., 760-N, 770-1, 770-2, ..., 770-N, 780-1, 780-2, ..., 780-N and the controller 752 in the embodiment depicted in FIG. 7 are the same as or similar to the switches 550-1, 550-2, ..., 550-N and the controller 552 in the embodiment depicted in FIG. 5, respectively. Although the illustrated active shielding device 700 is shown with certain components and described with certain functionality herein, other embodiments of the active shielding device may include fewer or more components to implement the same, less, or more functionality. For example, the active shielding device may include more than one analog wire shield unit.

In the embodiment depicted in FIG. 7, the switches 750-1, 750-2, ..., 750-N, 760-1, 760-2, ..., 760-N, 770-1, 770-2, ..., 770-N, 780-1, 780-2, ..., 780-N are configured to select one or more of the current sources 602-1, 602-2, ..., 602-N, 612-1, 612-2, ..., 612-N, 622-1, 622-2, ..., 622-N, 632-1, 632-2, ..., 632-N to apply to the analog wire shield unit 604, the first current to voltage converter 606-1, or the second current to voltage converter 606-2, based on control signals, $D_1, D_2, \ldots, D_N$. In the embodiment depicted in FIG. 7, the controller 752 is configured to generate control signals, $D_1, D_2, \ldots, D_N$ to control the switches 750-1, 750-2, ..., 750-N, 760-1, 760-2, ..., 760-N, 770-1, 770-2, ..., 770-N, 780-1, 780-2, ..., 780-N and/or at least one of the first and second current to voltage converters 606-1, 606-2. By controlling the switches and/or the current to voltage converters, voltages on the analog wire shield unit can vary (e.g., depending upon how many current source(s) or which of the current sources is/are selected), which makes it difficult for an attacker to access information by probing a voltage of the analog wire shield unit. The controller may be implemented in hardware (e.g., circuit or circuits), software, firmware, or a combination thereof. In an embodiment, the controller is implemented using a processor, such as a microcontroller, a host processor, a host, a DSP, or a CPU. The control signals, $D_1, D_2, \ldots, D_N$ may be digital signals, which can be random digital signals/ sequences or pre-defined digital signals/sequences. In some embodiments, the controller includes a random number generator configured to generate random digital sequences. Although the controller is shown in FIG. 7 as being a component of the active shielding device 700, in other embodiments, the controller is external to the active shielding device. In some embodiments, the controller is configured to shut down or disable a circuit to be protected, which can be connected to electrical wires or cables within the analog wire shield unit, electrical wires or cables between the current sources and the analog wire shield unit, or electrical wires or cables between the analog wire shield unit and the current to voltage converters 606-1, 606-2, if the electrical cables or wires within the analog wire shield unit are tampered with.

Digital active shielding can be combined with analog active shielding to provide more complex protection against invasive attacks. In some embodiments, one or more digital logic circuits are serially connected with an electrical cable or wire such that signals in the electrical cable or wire can be altered by the digital logic circuits. For example, even number (e.g., 2, 4, 6, 8, 14, 20) of inverters can be serially connected with an electrical cable or wire such that when a digital signal flows through these inverters, the output signal of the even number of inverters is identical with the original signal. However, when an attacker probes the electrical cable or wire, the probed voltage may not correspond to the original digital signal. For example, when an attacker probes the electrical cable or wire after an odd number of inverters, the probed voltage corresponds to an inverted version of the original digital signal. However, when an attacker probes the electrical cable or wire after an even number of inverters, the probed voltage corresponds to the original digital signal. Consequently, voltages on the electrical cable or wire may vary, depending upon the place or section at which the electrical cable or wire is probed, which makes it more difficult for an attacker to access information by probing the voltage at the electrical cable or wire.

Figure 8:
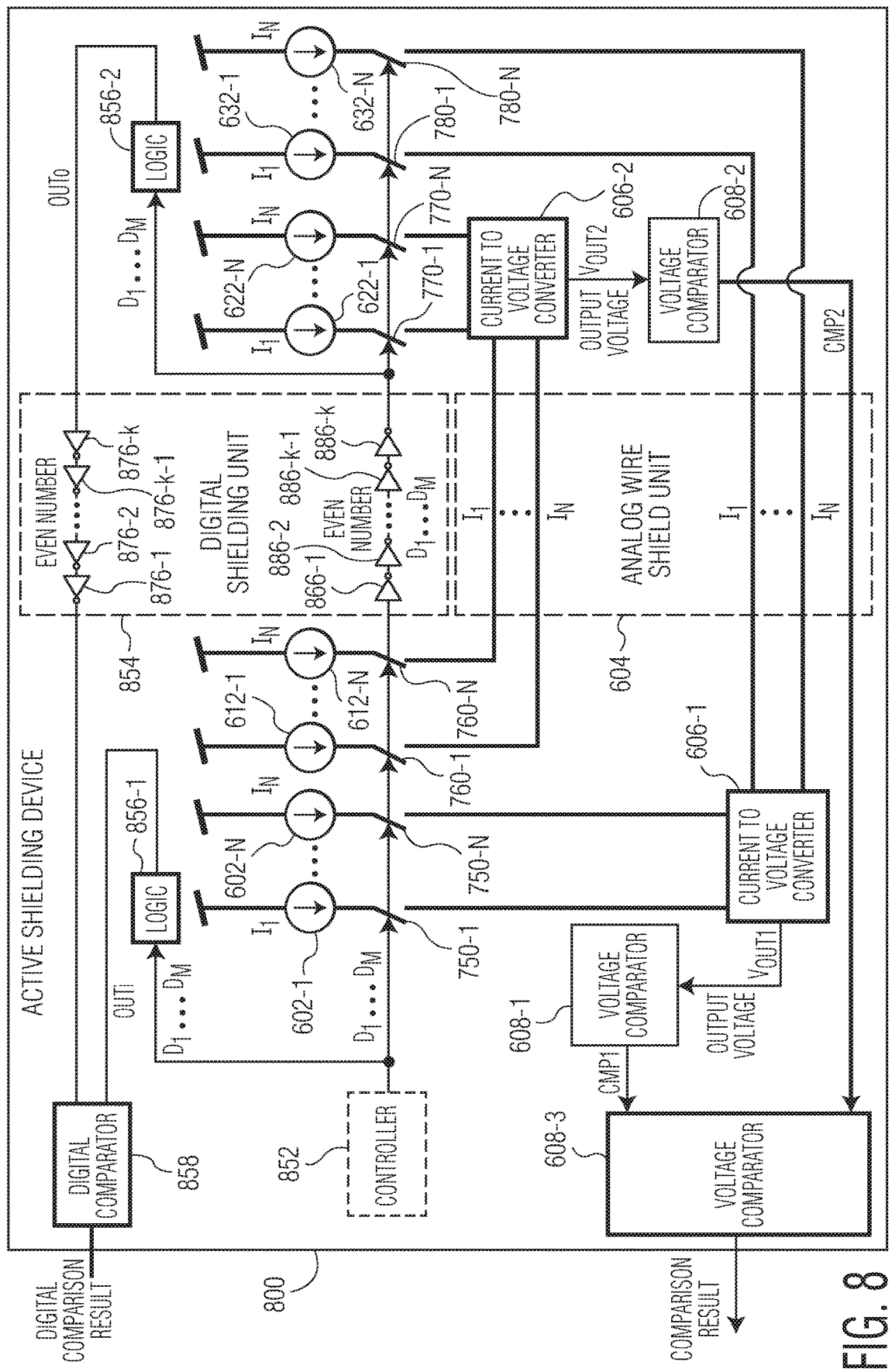
FIG. 8 depicts an active shielding device that includes a combination of a digital shielding unit and an analog wire shield unit in accordance with an embodiment of the invention.

FIG. 8 depicts an active shielding device 800 that includes a combination of a digital shielding unit 854 and the analog wire shield unit 604 in accordance with an embodiment of the invention. In the embodiment depicted in FIG. 8, the active shielding device includes the current sources 602-1, 602-2, ..., 602-N, 612-1, 612-2, ..., 612-N, 622-1, 622-2, ..., 622-N, 632-1, 632-2, ..., 632-N, the analog wire shield unit 604 connected to the current sources, the first and second current to voltage converters 606-1, 606-2 connected to the analog wire shield unit, the first and second voltage comparators 608-1, 608-2 connected to the current to voltage converters, the third voltage comparator 608-3 connected to the first and second voltage comparators 608-1, 608-2, the switches 750-1, 750-2, ..., 750-N, 760-1, 760-2, ..., 760-N, 770-1, 770-2, ..., 770-N, 780-2, ..., 780-N, an optional controller 852, the digital shielding unit 854 connected to the current sources, two digital logics 856-1, 856-2, and a digital comparator 858. The switches 750-1, 750-2, ..., 750-N, 760-1, 760-2, ..., 760-N, 770-1, 770-2, ..., 770-N, 780-1, 780-2, ..., 780-N and the controller 852 in the embodiment depicted in FIG. 8 are the same as or similar to the switches 550-1, 550-2, ..., 550-N and the controller 552 in the embodiment depicted in FIG. 5, respectively. Although the illustrated active shielding device 800 is shown with certain components and described with certain functionality herein, other embodiments of the active shielding device may include fewer or more components to implement the same, less, or more functionality. For example, the active shielding device may include more than one digital shielding unit and/or more than one analog wire shield unit.

In the embodiment depicted in FIG. 8, the digital shielding unit 854 is connected between the second set of current sources 612-1, 612-2, ..., 612-N, and to the third set of current sources 622-1, 622-2, ..., 622-N. In the embodiment depicted in FIG. 8, the digital shielding unit includes a first set of inverters 866-1, 866-2, ..., 866-K, where K is a positive even integer, which is connected between the second set of current sources 612-1, 612-2, ..., 612-N, and to the third set of current sources 622-1, 622-2, ..., 622, and a second set of inverters 876-1, 876-2, ..., 876-K, which is connected between the digital logic 856-2 and the digital comparator 858. The digital shielding unit may include one or more electrical cables or wires, which are made of conductive materials (e.g., metals). In some embodiments, the electrical cables or wires within the digital shielding unit is located to the top metal layer of the digital shielding unit 854. When an attacker probes the electrical cables or wires, the probed voltage may not correspond to the original digital signal. For example, when an attacker probes the electrical cable or wire after an odd number of inverters, the probed voltage corresponds to an inverted version of the original digital signal. However, when an attacker probes the electrical cable or wire after an even number of inverters, the probed voltage corresponds to the original digital signal. Consequently, voltages on the electrical cable or wire may vary, depending upon the place or section at which the electrical cable or wire is probed, which makes it more difficult for an attacker to access information by probing the voltage at the electrical cable or wire. Although the illustrated the digital shielding unit 854 is shown with certain components and described with certain functionality herein, other embodiments of the digital shielding unit may include fewer or more components to implement the same, less, or more functionality. For example, the digital shielding unit may include only one set of even number of inverters.

In the embodiment depicted in FIG. 8, the controller 852 is configured to generate digital control signals, $D_1$, $D_2$, ..., $D_M$, where M is a positive integer that is greater than one, which may be random digital signals/sequences or pre-defined digital signals/sequences. The controller may be implemented in hardware (e.g., circuit or circuits), software, firmware, or a combination thereof. In an embodiment, the controller is implemented using a processor, such as a microcontroller, a host processor, a host, a DSP, or a CPU. In some embodiments, the controller includes a random number generator configured to generate random digital sequences. The control signals, $D_1$, $D_2$, ..., $D_N$, where N is an integer that is smaller than M, to control the switches 750-1, 750-2, ..., 750-N, 760-1, 760-2, ..., 760-N, 770-1, 770-2, ..., 770-N, 780-1, 780-2, ..., 780-N. By controlling the switches, voltages on the analog wire shield unit 604 can vary (e.g., depending upon how many current source(s) or which of the current sources is/are selected), which makes it difficult for an attacker to access information by probing a voltage of the analog wire shield unit. Although the controller is shown in FIG. 8 as being a component of the active shielding device 800, in other embodiments, the controller is external to the active shielding device. In some embodiments, the controller is configured to shut down or disable a circuit to be protected, which can be connected to electrical wires or cables within the analog wire shield unit, electrical wires or cables between the current sources and the analog wire shield unit, or electrical wires or cables between the current to voltage converters 606-1, 606-2 and the analog wire shield unit, if the electrical cables or wires within the analog wire shield unit are tampered with.

In the embodiment depicted in FIG. 8, the digital logic 856-1 is configured to generate a result signal, OUTi, based on the digital signals, $D_1$, $D_2$, ..., $D_M$. The digital logic 856-2 is configured to generate a result signal, OUTo, based on the digital signals, $D_1$, $D_2$, ..., $D_M$. The digital logics 856-1, 856-2 are identical digital circuits and/or configured to perform identical functions. In some embodiments, the digital logics are digital gates such as NAND gates, OR gates or XOR gates, or more complex digital logics. The digital comparator 858 is configured to compare the result signal, OUTi, from the digital logic 856-1 with the result, OUTo, from the digital logic 856-2 to generate a digital comparison result. Based on the digital comparison result from the digital comparator, it can be determined whether or not the electrical cables or wires within the digital shielding unit 854 are tampered with (e.g., voltage probing that involves cutting into the electrical cables or wires within the digital shielding unit or altering at least one voltage or current in the electrical cables or wires within the digital shielding unit. In some embodiments, if the result signal, OUTi, from the digital logic 856-1 is identical with the result, OUTo, from the digital logic 856-2, it is determined that the electrical cables or wires within the digital shielding unit are not tampered with. In these embodiments, if the result signal, OUTi, from the digital logic 856-1 is different from the result, OUTo, from the digital logic 856-2, it is determined that the electrical cables or wires within the digital shielding unit are tampered with. In some embodiments, the active shielding device includes a controller (e.g., the controller 852) that is configured to determine whether or not the electrical cables or wires within the digital shielding unit are tampered with. The controller may be implemented in hardware (e.g., circuit or circuits), software, firmware, or a combination thereof. In an embodiment, the controller is implemented using a processor, such as a microcontroller, a host processor, a host, a DSP, or a CPU. In some embodiments, the controller is configured to shut down or disable a circuit to be protected, which can be connected to electrical wires or cables within the digital shielding unit, electrical wires or cables between the current sources and the digital shielding unit, or electrical wires or cables between the digital shielding unit and the digital comparator, if the electrical cables or wires within the digital shielding unit are tampered with.

Figure 9:
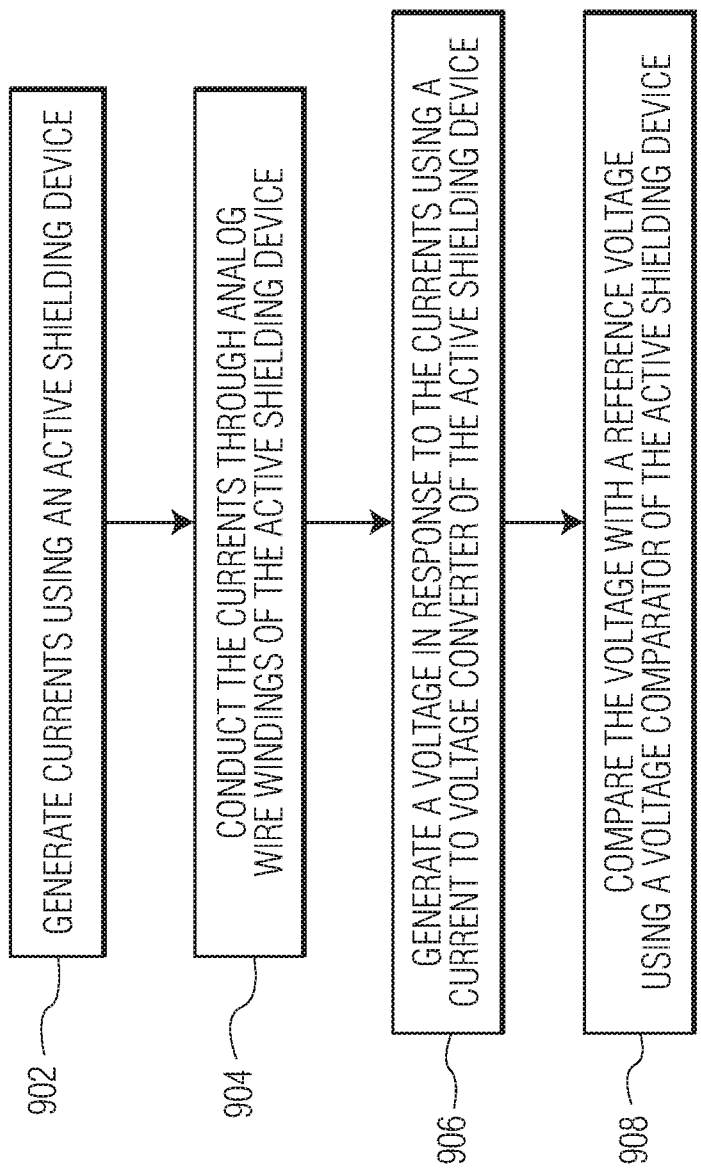
FIG. 9 is a process flow diagram of a method of communications in accordance to an embodiment of the invention.

FIG. 9 is a process flow diagram of a method for active shielding in accordance to an embodiment of the invention. According to the method, at block 902, currents are generated using an active shielding device. At block 904, the currents are conducted through analog wire windings of the active shielding device. At block 906, a voltage is generated in response to the currents using a current to voltage converter of the active shielding device. At block 908, the voltage is compared with a reference voltage using a voltage comparator of the active shielding device. The active shielding device may be similar to, the same as, or a component of the active shielding device 100 depicted in FIG. 1, the active shielding device 500 depicted in FIG. 5, the active shielding device 600 depicted in FIG. 6, and/or the active shielding device 700 depicted in FIG. 7.

FIG. 10 is a process flow diagram of a method for active shielding in accordance to another embodiment of the invention. According to the method, at block 1002, currents are generated using an active shielding device. At block 1004, the currents are conducted through analog wire windings of the active shielding device in response to a digital control sequence. At block 1006, a voltage is generated in response to the currents using a current to voltage converter of the active shielding device. At block 1008, the voltage is compared with a reference voltage using a voltage comparator of the active shielding device. At block 1010, the digital control sequence is processed before conducting the digital control sequence through inverters of an active shielding unit of the active shielding device and after conducting the digital control sequence through the inverters using digital logics of the active shielding device to generate a first processing result signal and a second result signal, respectively. At black 1012, the first processing result signal is compared with the second result signal. The active shielding device may be similar to, the same as, or a component of the active shielding device 800 depicted in FIG. 8.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An active shielding device, the active shield device comprising:
   a plurality of current sources configured to generate a plurality of currents;
   an analog wire shield unit connected to the current sources;
   a plurality of switches connected between the current sources and the analog wire shield unit;
   a current to voltage converter connected to the analog wire shield unit and configured to generate a voltage in response to the currents that are generated by the current sources and a digital control sequence for the switches;
   a voltage comparator connected to the current to voltage converter and configured to compare the voltage that is generated by the current to voltage converter with a reference voltage;
   a digital active shielding unit connected to the current sources;
   a plurality of digital logics configured to process the digital control sequence before conducting the digital control sequence through the digital active shielding unit and after conducting the digital control sequence through the digital active shielding unit to generate a first processing result signal and a second result signal; and
   a digital comparator configured to compare the first processing result signal with the second result signal.

2. The active shielding device of claim 1, wherein the digital active shielding unit comprises an even number of inverters.

3. The active shielding device of claim 1, wherein the digital logics are identical to each other.

4. The active shielding device of claim 1, wherein one of the digital logics is connected to the switches through the digital active shielding unit.

5. The active shielding device of claim 1, wherein the current sources are connected in parallel to each other.

6. The active shielding device of claim 1, wherein the analog wire shield unit comprises a plurality of analog wire windings that are connected between the current sources and the current to voltage converter.

7. The active shielding device of claim 6, wherein each of the analog wire windings is connected to a different current source of the current sources.

8. The active shielding device of claim 1, further comprising:
   a controller configured to generate the digital control sequence.

9. The active shielding device of claim 8, wherein the controller comprises a random number generator.

10. An active shielding device, the active shield device comprising:
    first, second, third, and fourth sets of current sources, wherein each of the first, second, third, and fourth sets of current sources is configured to generate a plurality of currents;
    an analog wire shield unit connected to the second and fourth sets of current sources;
    first, second, third, and fourth sets of switches that are connected to the first, second, third, and fourth sets of current sources, respectively, and are controlled by a digital control sequence;
    a first current to voltage converter connected to the first set of current sources and to the fourth set of current sources through the analog wire shield unit, wherein the first current to voltage converter is configured to generate a first voltage in response to the currents that are generated by the first and fourth sets of current sources;
    a first voltage comparator connected to the first current to voltage converter and configured to compare the first voltage with a first reference voltage;
    a second current to voltage converter connected to the second set of current sources and to the third set of current sources through the analog wire shield unit, wherein the second current to voltage converter is configured to generate a second voltage in response to the currents that are generated by the second and third sets of current sources;
    a second voltage comparator connected to the second current to voltage converter and configured to compare the second voltage with a second reference voltage;
    a third voltage comparator configured to compare results from the first voltage comparator and from the second voltage comparator;
    a digital active shielding unit connected to the second and third sets of current sources;
    a plurality of digital logics configured to process the digital control sequence before conducting the digital control sequence through the digital active shielding unit and after conducting the digital control sequence through the digital active shielding unit to generate a first processing result signal and a second result signal; and a digital comparator configured to compare the first processing result signal with the second result signal.

11. The active shielding device of claim 10, wherein the digital active shielding unit comprises an even number of inverters.

12. The active shielding device of claim 10, wherein the digital logics are identical to each other.

13. The active shielding device of claim 10, wherein one of the digital logics is connected to the switches through the digital active shielding unit.

14. The active shielding device of claim 10, wherein each current source within one of the first, second, third, and fourth sets of current sources is connected in parallel to each other.

15. The active shielding device of claim 10, wherein the analog wire shield unit comprises a plurality of analog wire windings that are connected between the fourth set of current sources and the first current to voltage converter and between the second set of current sources and the second current to voltage converter.

16. The active shielding device of claim 10, wherein the first set of switches are connected between the first set of current sources and the first current to voltage converter, wherein the second set of switches are connected between the second set of current sources and the analog wire shield unit, wherein the third set of switches are connected between the third set of current sources and the second current to voltage converter, and wherein the fourth set of switches are connected between the fourth set of current sources and the analog wire shield unit.

17. The active shielding device of claim 10, further comprising:

a controller configured to generate the digital signal sequence to control the first, second, third, and fourth sets of switches.

18. The active shielding device of claim 17, wherein the controller comprises a random number generator.

19. A method for active shielding, the method comprising:

generating a plurality of currents using an active shielding device;

conducting the currents through a plurality of analog wire windings of an active shielding unit of the active shielding device in response to a digital control sequence;

generating a voltage in response to the currents using a current to voltage converter of the active shielding device;

comparing the voltage with a reference voltage using a voltage comparator of the active shielding device;

processing the digital control sequence before conducting the digital control sequence through a plurality of inverters of an active shielding unit of the active shielding device and after conducting the digital control sequence through the inverters using a plurality of digital logics of the active shielding device to generate a first processing result signal and a second result signal, respectively; and comparing the first processing result signal with the second result signal.

20. The method of claim 19, wherein the digital active shielding unit comprises an even number of inverters, and wherein the digital logics are identical to each other.

* * * * *